United States Patent
Deshpande et al.

(10) Patent No.: US 12,542,013 B2
(45) Date of Patent: Feb. 3, 2026

(54) SYSTEM AND METHOD FOR DETECTING PARAMETRIC OUTLIERS IN RELATION TO VEHICLE PULL/DRIFT DATA

(71) Applicant: FORD GLOBAL TECHNOLOGIES, LLC, Dearborn, MI (US)

(72) Inventors: Shreshta Rajakumar Deshpande, Ann Arbor, MI (US); Ala Eddine Omrani, Canton, MI (US); Hassene Jammoussi, Canton, MI (US); Michael George Lysenko, Canton, MI (US); Daniel Slavin, Oxford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 18/138,314

(22) Filed: Apr. 24, 2023

(65) Prior Publication Data
US 2024/0355153 A1 Oct. 24, 2024

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01); *G07C 5/0841* (2013.01)

(58) Field of Classification Search
CPC ..... B60W 40/10; G07C 5/008; G07C 5/0808; G07C 5/0841
See application file for complete search history.

(56) References Cited

U.S. PATENT DOCUMENTS

| | | | |
|---|---|---|---|
| 8,798,865 B1 * | 8/2014 | Raad | B62D 6/04 701/41 |
| 10,134,278 B1 | 11/2018 | Konrardy et al. | |

(Continued)

FOREIGN PATENT DOCUMENTS

| | | | | |
|---|---|---|---|---|
| CN | 110194168 A | * | 9/2019 | B60L 15/20 |
| CN | 114919651 A | * | 8/2022 | B62D 5/0463 |

(Continued)

OTHER PUBLICATIONS

Huang, C., & Petukhina, A. (2022). Applied Time Series Analysis and Forecasting with Python (1st ed.). Springer International Publishing. https://doi.org/10.1007/978-3-031-13584-2 (Year: 2022).*

(Continued)

*Primary Examiner* — Kito R Robinson
*Assistant Examiner* — Rose Ridder
(74) *Attorney, Agent, or Firm* — Burr & Forman; Lorne Forsythe

(57) ABSTRACT

A method of identifying parametric outliers associated with vehicle pull/drift compensation may include receiving fleet data from a plurality of vehicles, the fleet data including pull/drift steering data associated with the plurality of vehicles, processing the pull/drift steering data to generate cleaned pull/drift steering data, and employing a machine learning module to define, for each of a plurality of respective different vehicle classifications, an outlier threshold for comparison to the cleaned pull/drift steering data to identify parametric outliers, and to identify the parametric outliers within each vehicle classification based on the comparison.

18 Claims, 4 Drawing Sheets

(56) References Cited

U.S. PATENT DOCUMENTS

| | | | |
|---|---|---|---|
| 10,713,955 | B2 | 7/2020 | Tong et al. |
| 10,922,906 | B2 | 2/2021 | Wang et al. |
| 11,328,219 | B2 | 5/2022 | Zhang et al. |
| 12,131,592 | B2 * | 10/2024 | Angilella ............ G07C 5/0808 |
| 2006/0047485 | A1 * | 3/2006 | Whitefield ............ G05B 17/02 |
| | | | 702/194 |
| 2022/0068051 | A1 | 3/2022 | Krishnamurthy et al. |
| 2023/0084964 | A1 * | 3/2023 | Ghanbari ............ B60W 40/09 |
| | | | 701/533 |

FOREIGN PATENT DOCUMENTS

| | | | | |
|---|---|---|---|---|
| DE | 10235525 | A1 | | 4/2003 |
| DE | 102008060194 | A1 | | 6/2010 |
| KR | 20200022974 | A | * | 3/2020 ............ B60W 40/10 |
| KR | 20220075922 | A | | 6/2022 |

OTHER PUBLICATIONS

Barai, A. (2020). "Normal Distribution and Machine Learning". Medium. https://medium.com/analytics-vidhya/normal-distribution-and-machine-learning-ec9d3ca05070 (Year: 2020).*

[SHT] Statistics How To. (2022). "Box Cox Transformation: Definition, Examples" https://www.statisticshowto.com/probability-and-statistics/normal-distributions/box-cox-transformation/ (Year: 2022).*

Kocic, J. et al., "An End-to-End Deep Neural Network for Autonomous Driving Designed for Embedded Automotive Platforms", Sensors, 19(9):2064, May 2019, pp. 1-26.

Xu, D. et al., "A Model Predictive Control Method for Vehicle Drifting Motions with Measurable Errors", World Electric Vehicle Journal, vol. 13(3):54, Mar. 2022, pp. 1-17.

Xu, D. et al., "Robust Control with Uncertain Disturbances for Vehicle Drift Motions", Applied Sciences, 11(11), 4917, MDPI AG, May 2021, pp. 1-16.

Lee, T. et al., "Real-time Drift-Driving Control for an Autonomous Vehicle: Learning from Nonlinear Model Predictive Control via a Deep Neural Network", Electronics, 11:2651, Aug. 2022, pp. 1-18.

* cited by examiner

SYSTEM AND METHOD FOR DETECTING PARAMETRIC OUTLIERS IN RELATION TO VEHICLE PULL/DRIFT DATA

TECHNICAL FIELD

Example embodiments generally relate to detecting parametric outliers in a data set and, more particularly, relate to a system and method for employing machine learning to enable early detection of parametric outliers in relation to vehicle pull/drift data.

BACKGROUND

Service issues relating to any particular system of a vehicle are always advantageously kept to a minimum. Thus, the earlier any potential issues can be identified, the faster those issues can be addressed. In a typical case involving pull or drift associated with vehicle steering, the issues and any potential resolutions that are employed would be collected from data that is received over a relatively long period of time. As such, it may be desirable to develop faster methods and tools for identifying and addressing similar issues to increase responsiveness and efficiency.

BRIEF SUMMARY OF SOME EXAMPLES

In accordance with an example embodiment, a method of identifying parametric outliers associated with vehicle pull/drift compensation may be provided. The method may include receiving fleet data from a plurality of vehicles, the fleet data including pull/drift steering data associated with the plurality of vehicles, processing the pull/drift steering data to generate cleaned pull/drift steering data, and employing a machine learning module to define, for each of a plurality of respective different vehicle classifications, an outlier threshold for comparison to the cleaned pull/drift steering data to identify parametric outliers, and to identify the parametric outliers within each vehicle classification based on the comparison.

In another example embodiment, a vehicle pull/drift data classification engine may be provided. The classification engine may include a data pre-processor and a machine learning module. The data pre-processor may receive fleet data from a plurality of vehicles. The fleet data may include pull/drift steering data associated with the plurality of vehicles. The data pre-processor may also process the pull/drift steering data to generate cleaned pull/drift steering data. The machine learning module may employ machine learning to define, for each of a plurality of respective different vehicle classifications, an outlier threshold for comparison to the cleaned pull/drift steering data to identify parametric outliers, and to identify the parametric outliers within each vehicle classification based on the comparison.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
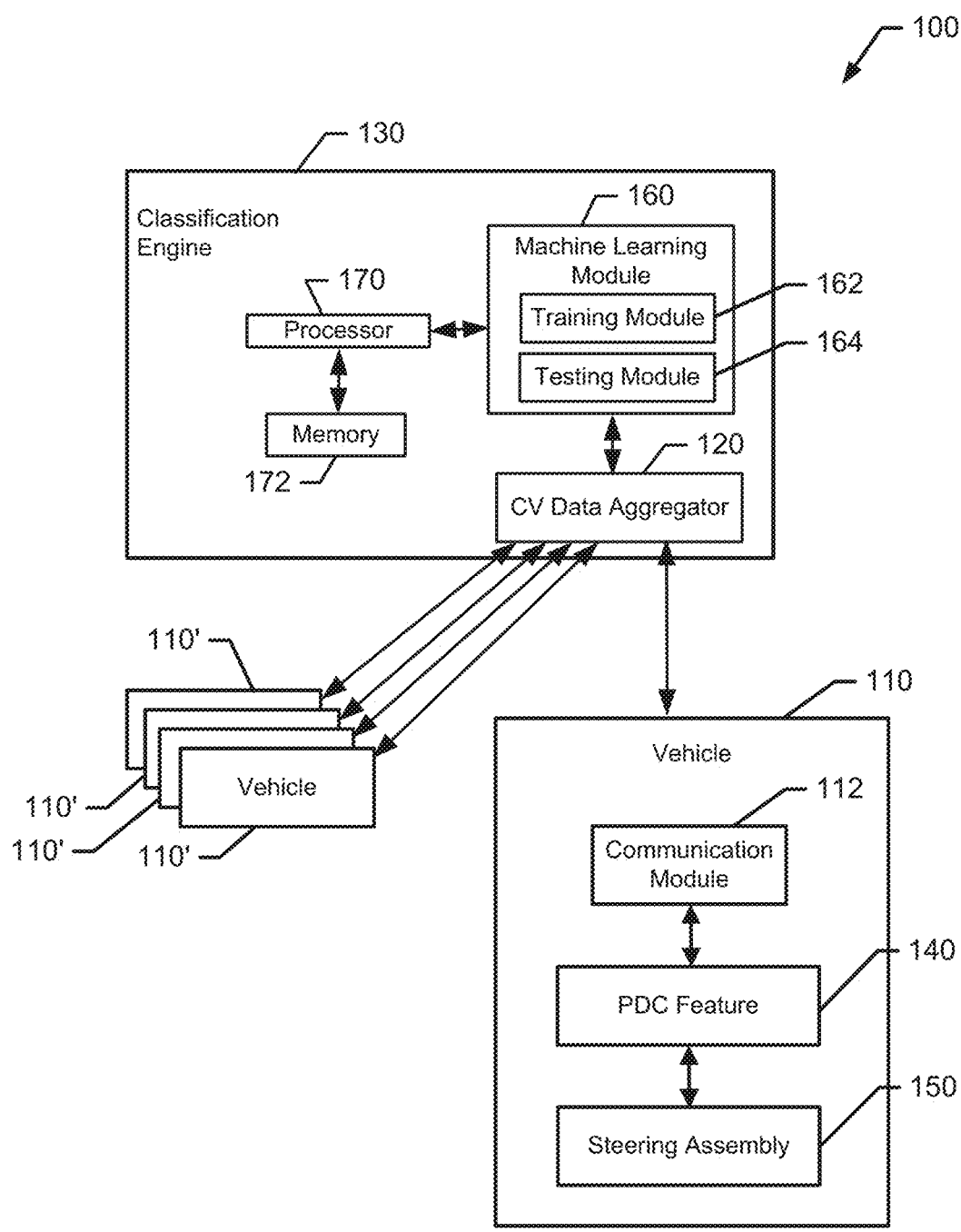
FIG. 1 illustrates a block diagram of a connected vehicle monitoring system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As discussed above, early detection of situations where pull and/or drift data for a particular vehicle, or a class of vehicles, is outside of parametric norms may be desirable. In this context the term "pull" may be defined as a higher than normal holding effort (of steering wheel torque) that is required to drive straight. Meanwhile, "drift" may be defined as a departure from a straight line of driving when hands are removed from the steering wheel. While some small amount of pull and/or drift may be normal and acceptable, any amount that exceeds certain thresholds of acceptability should be corrected. If a vehicle, or a class of vehicles, can be identified to experience more pull and/or drift than normal early on, the vehicle or class of vehicles may have a remedy prescribed early as well, thereby increasing driver satisfaction on the whole.

Various issues have existed which have interfered with a general ability to make this type of early identification. In this regard, since data has normally been slow to build statistically significant data sets. Moreover, the data submissions are often not made in any consistent format, or even at consistent times, thereby making the data sets somewhat incoherent, and difficult to work with. Thus, solving the problem at issue may first require the provision of a means by which to obtain consistent and coherent data. Once such consistent and coherent data can be obtained, particularly in a timely manner, it may further be desirable to develop non-rigid and flexible means to identify parametric outliers in a dynamic environment where data sets grow and change over time.

Some example embodiments described herein may address the problems described above. In this regard, for example, some example embodiments may provide an ability to obtain data at a fleet level in real time or near real time in many cases, and rapidly in any case. Moreover, example embodiments may allow the data that is obtained to be cleaned or otherwise formatted consistently prior to analysis. The analysis itself may then be performed using machine learning that is adaptive to the changing nature of the data associated with both new and old classes of vehicles. As a result, overall efficiency, vehicle performance and driver experience/satisfaction may also be enhanced.

FIG. 1 illustrates a block diagram of a connected vehicle monitoring system 100 of an example embodiment. The system 100 may monitor for any of a number of different parameters using data obtained from connected vehicles (e.g., vehicles that are communicatively connected to the system 100). However, in accordance with an example embodiment, the parameters obtained may include pull and/or drift data associated with the steering systems of each instance of a vehicle 110 connected to the system 100.

In an example embodiment, the vehicle 110 (and a plurality of other instances of vehicles 110') may include a communication module 112 that is communicatively coupled to a connected vehicle data aggregator 120. The communication module 112 may use wired or wireless communication means, and may communicate data in real time (or near real time), or periodically (e.g., in upload bursts of data that are scheduled or happen responsive to various events) to the connected vehicle data aggregator 120. When wireless communication is employed, various different communication protocols for short or long range wireless communication may be employed without limitation.

The vehicle 110 may be a member vehicle in a managed fleet of vehicles (e.g., associated with a particular organization) along with the other vehicles 110'. However, it is also possible that the vehicle 110 may be privately owned, and may opt in to submission of data associated with the vehicle 110 to the connected vehicle data aggregator 120 to enable the data of the vehicle 110 to be analyzed for the benefit of the owner of the vehicle 110. In either case, the parametric data of the vehicle 110 (and the other vehicles 110') may be provided to the connected vehicle data aggregator 120 to enable a classification engine 130 to perform parametric analysis on some or all of the parametric data received.

The parametric data may include, among other things, fuel usage information, location information (e.g., via GPS or other sources), odometer readings, various vehicle health-related parameters, and/or the like. Moreover, in an example embodiment, the parametric data that is provided over the system 100 may include pull and/or drift data (i.e., pull/drift data) that relates to or is indicative of either or both of pull and drift torques that are encountered by the vehicle 110. Moreover, because the pull/drift data may, in at least some cases, be dependent upon vehicle driving conditions, location, or other factors, some further context information (e.g., trip summary information) may also be included in the parametric data, and the context information may by synchronized with the pull/drift data so that correlations between various events, conditions or locations encountered during a trip can be made to the pull/drift data collected during the trip.

The pull/drift data may be collected from a pull/drift compensation (PDC) feature 140, which may extract pull/drift compensation torque values from interaction with a steering assembly 150 of the vehicle 110. In this regard, the PDC feature 140 may constantly measure and adjust the steering wheel torque required to drive straight. The PDC feature 140 may therefore take inputs including handwheel torque, handwheel angle, vehicle speed and/or the like. These inputs may enable the PDC feature 140 to determine whether the vehicle 110 is driving straight and various torque values that are associated with the current driving situation. The PDC feature 140 may further determine a torque compensation value that may be aimed at augmenting the effort of the driver to minimize driver effort needed to drive straight (e.g., by applying the torque compensation as needed). In some cases, the PDC feature 140 may further be configured to use the vehicle speed information in order to conduct scaling on the torque compensation value that is otherwise determined. The scaling conducted based on vehicle speed may result in the provision of a scaled compensation torque value that may be provided to the steering assembly 150 to assist the driver. However, in some embodiments, a further limitation may be provided on the rate at which torque is allowed to change. In other words, the PDC feature 140 may further include a torque rate limiter in some cases. Thus, the scaled compensation torque value may be provided to a torque rate limiter before generating a final value for PDC applied torque that is output from the PDC feature 140 to the steering assembly 150.

In an example embodiment, the communication module 112 may provide intermediate and/or final values generated by the PDC feature 140 to the connected vehicle data aggregator 120. Thus, for example, the PDC applied torque, the scaled compensation torque value, the torque compensation, and/or any of the inputs provided to the PDC feature 140 may be provided to the connected vehicle data aggregator 120 as examples of pull/drift steering data that may be used as described hereinafter. In some example embodiments, the pull/drift steering data may be used by the classification engine 130 to identify trends or parametric outlier data that can be used to identify a particular vehicle having an issue (e.g., PDC behavior outside typically expected or accepted ranges of values) that could be corrected. Correction of misalignments or other issues may then be undertaken accordingly. To accomplish this, it may be appreciated that the pull/drift steering data may be specific to the vehicle 110 and therefore associated with identification information that uniquely identifies the vehicle 110. The identification information may be the vehicle identification number (VIN) in some cases.

When the pull/drift steering data is received at the connected vehicle data aggregator 120, the pull/drift steering data may be pre-processed as described in greater detail below before the classification engine 130 employs a machine learning module 160 to determine whether the vehicle 110 has any parametric outliers associated therewith. Parametric outliers may be considered individual parameters that fall outside of normal or accepted ranges for such parameters within a given fleet or class of vehicles. These normal or accepted ranges may be initially set based on estimates and/or test data done prior to launching a new class of vehicles. However, regardless of how initially formed, the normal or accepted ranges may be modified over time to be adapted to current production trends or states so that parametric outliers are not statically or rigidly defined, but instead dynamically determined. Dynamic identification of parametric outliers further requires dynamic adjustment and maintenance of the range values used to identify the parametric outliers. As such, the ranges themselves may be referred to as dynamic ranges.

In an example embodiment, the machine learning module 160 may be trained (e.g., via training module 162) and then testing may be conducted (e.g., via testing module 164) to identify dynamic ranges and parametric outliers based on the dynamic ranges. The operation of the machine learning module 160 will be described in greater detail below. However, the machine learning module 160 may be operably coupled to (or instantiated via) processing circuitry, which may include a processor 170 and memory 172. The processing circuitry (e.g., processor 170 and memory 172) may be configurable to perform data processing as described herein. As such, for example, the machine learning module 160 may include (or otherwise have access to) memory (e.g., the memory 172) for storing instructions or applications for the performance of various functions and a corresponding processor (e.g., processor 170) for executing stored instructions or applications. The classification engine 130 may also include software and/or corresponding hardware for enabling the performance of the respective functions of the classification engine 130 including, for example, the receipt of PDC parameters, execution of various pre-processing or cleaning functions and/or algorithms associated with processing of the PDC parameters and the generation of various content or outputs for review or consideration by an operator or user.

In one embodiment, the processing circuitry (e.g., the processor 170 and memory 172) may be in communication with or otherwise control a user interface of the classification engine 130. As such, the processing circuitry may be embodied as a circuit chip (e.g., an integrated circuit chip) configured (e.g., with hardware, software or a combination of hardware and software) to perform operations described herein. Thus, for example, the processing circuitry may be embodied as a portion of a server, computer, laptop, workstation or even one of various mobile computing devices.

The user interface may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, or other input/output mechanisms. In some cases, the user interface may also include a series of web pages or interface consoles generated to guide the user through various options, commands, flow paths and/or the like for control of or interaction with the classification engine 130 or, more specifically, with the machine learning module 160.

In an example embodiment, the memory 172 may include one or more non-transitory storage or memory devices such as, for example, volatile and/or non-volatile memory that may be either fixed or removable. The memory 172 may be configured to store information, data, applications, instructions or the like for enabling the apparatus to carry out various functions in accordance with example embodiments of the present invention. For example, the memory 172 could be configured to buffer input data for processing by the processor 170. Additionally or alternatively, the memory 172 could be configured to store instructions for execution by the processor 170. As yet another option, the memory 172 may include one of a plurality of databases that may store a variety of files, contents or data sets, or structures used to enable data pre-processing, cleaning, filtering, and/or PDC compensation calculations associated with operation of the classification engine 130. Among the contents of the memory 172, applications may be stored for execution by the processor 170 in order to carry out the functionality associated with each respective application.

The processor 170 may be embodied in a number of different ways. For example, the processor 170 may be embodied as various processing means such as a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 170 may be configured to execute instructions stored in the memory 172 or otherwise accessible to the processor 170. As such, whether configured by hardware or software methods, or by a combination thereof, the processor 170 may represent an entity (e.g., physically embodied in circuitry) capable of performing operations according to embodiments of the present invention while configured accordingly. Thus, for example, when the processor 170 is embodied as an ASIC, FPGA or the like, the processor 170 may be specifically configured hardware for conducting the operations described herein. Alternatively, as another example, when the processor 170 is embodied as an executor of software instructions, the instructions may specifically configure the processor 170 to perform the operations described herein.

In an example embodiment, the processor 170 (or the processing circuitry) may be embodied as, include or otherwise control the classification engine 130 (and/or machine learning module 160), which may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the classification engine 130 (and/or machine learning module 160) as described herein.

Figure 2:
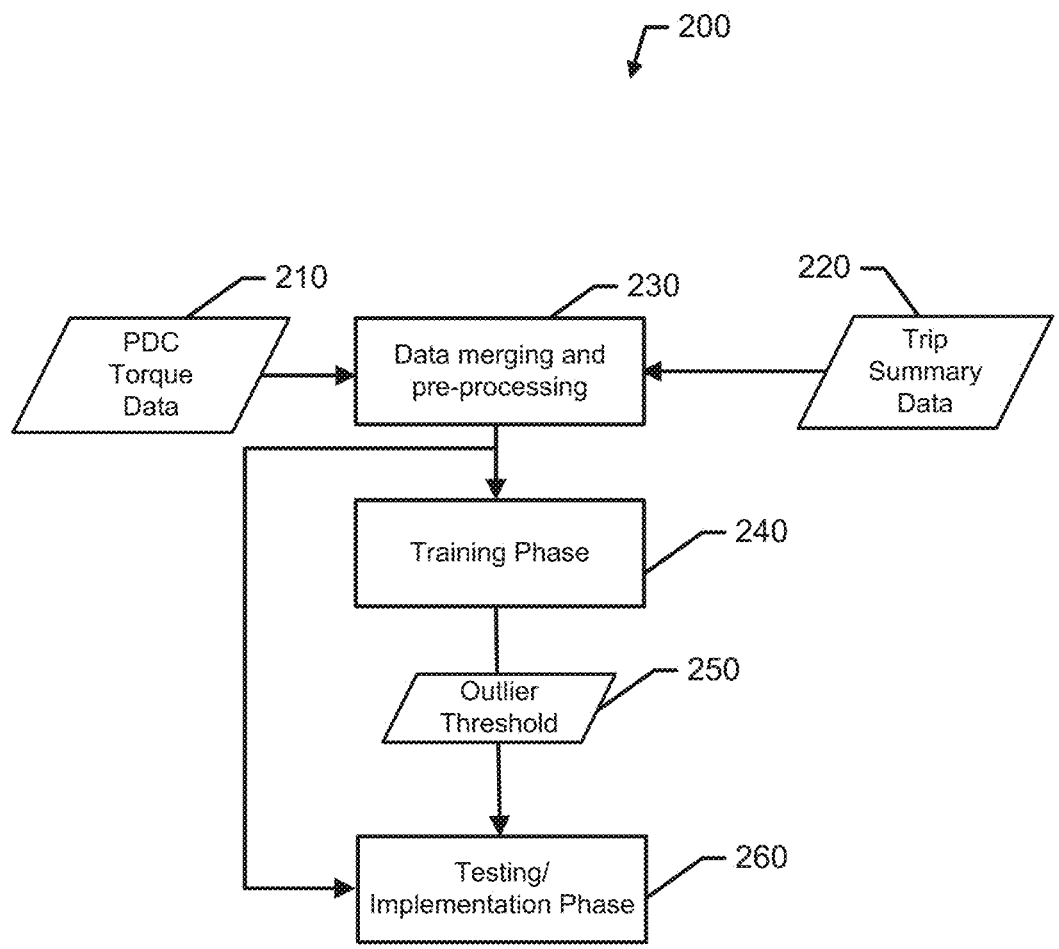
FIG. 2 illustrates a process flow associated with operation of a machine learning module according to an example embodiment.

Turning now to FIG. 2, operation of the classification engine 130 according to one example embodiment will be discussed in greater detail. In this regard, FIG. 2 illustrates an algorithm for operation of parametric outlier detection 200 in accordance with an example embodiment. In this regard, PDC torque data 210 and trip summary data 220 may initially be provided to the classification engine 130 to enable data merging and pre-processing at operation 230. The PDC torque data 210 is an example of the pull/drift steering data discussed above in reference to FIG. 1. The trip summary data 220 is an example of the context information discussed above in reference to FIG. 1.

Upon receipt of the PDC torque data 210 and the trip summary data 220, the classification engine 130 may initially perform the data merging and pre-processing of operation 230 to be performed since the PDC torque data 210 is arriving from many different sources (e.g., the vehicle 110 and other vehicles 110'). The PDC torque data 210 may be stored (e.g., via memory 172) in various formatted tables to enable parsing and/or merging of data along with the context information provided by the trip summary data 220. Either or both of the PDC torque data 210 and the trip summary data 220 may be filtered before or after aggregation with other data in order to clean the merged data and bolster confidence in the accuracy of the data. This gives each data stream context and structure that allows comparison with confidence.

In an example embodiment, the PDC torque data 210 and the trip summary data 220 may include variables therein relating to raw data, PDC torque readings, tire status information along with VIN or other identification information and odometer data for the given VIN. These variable values (and perhaps others) may be transformed into numerical values and cleaned by removing any redundant entries (e.g., entries for the same odometer value and VIN at different times). After cleaning, cleaned PDC data for a given VIN may be stored and merged with cleaned PDC data for other VINs that are included in the same vehicle or fleet classification.

In some embodiments the pre-processing of the classification engine 130 may further include removal of trips that are either too short in duration or too slow (or fast) in traversal time to be of statistical value to the analysis. In this regard, for example, a very short or slow repositioning of the vehicle 110 (e.g., to move parking spots) may not provide any useful data for purposes of the analysis described herein.

Start and stop times (e.g., based on park times), odometer values (to determine distance traveled), trip speed (average), and/or other informational cues may be used to ensure that only reliable and relevant data is studied. Thus, temporal data filtering (eliminating trips that are too short in duration) or speed-based trip filtering (eliminating trips that occur outside speeds associated with normal travel in which parametric outliers can reliably be determined may be accomplished as part of the data merging and pre-processing at operation 230.

Thereafter, the training module 162 may engage in a training phase 240 in order to determine an outlier threshold 250 that is used to identify parametric outliers. A testing/implementation phase 260 may then follow as controlled by the testing module 164 of FIG. 1. The testing/implementation phase 260 may represent that phase (operating on a trained classifier) in which parametric outliers are routinely and continuously identified based on the PDC torque data 210 and corresponding trip summary data 220 that continues to be received over time. The original training phase 240 may not need to be repeated in some cases, so flow may go directly to the testing/implementation phase 260 after data merging and pre-processing at operation 230. However, it is noteworthy that the machine learning module 160 may be configured to continue to dynamically adjust the outlier threshold 250 over time, and therefore the ranges of values that are acceptable (i.e., not parametric outliers) will continue to adapt and evolve over time as well.

Figure 3:
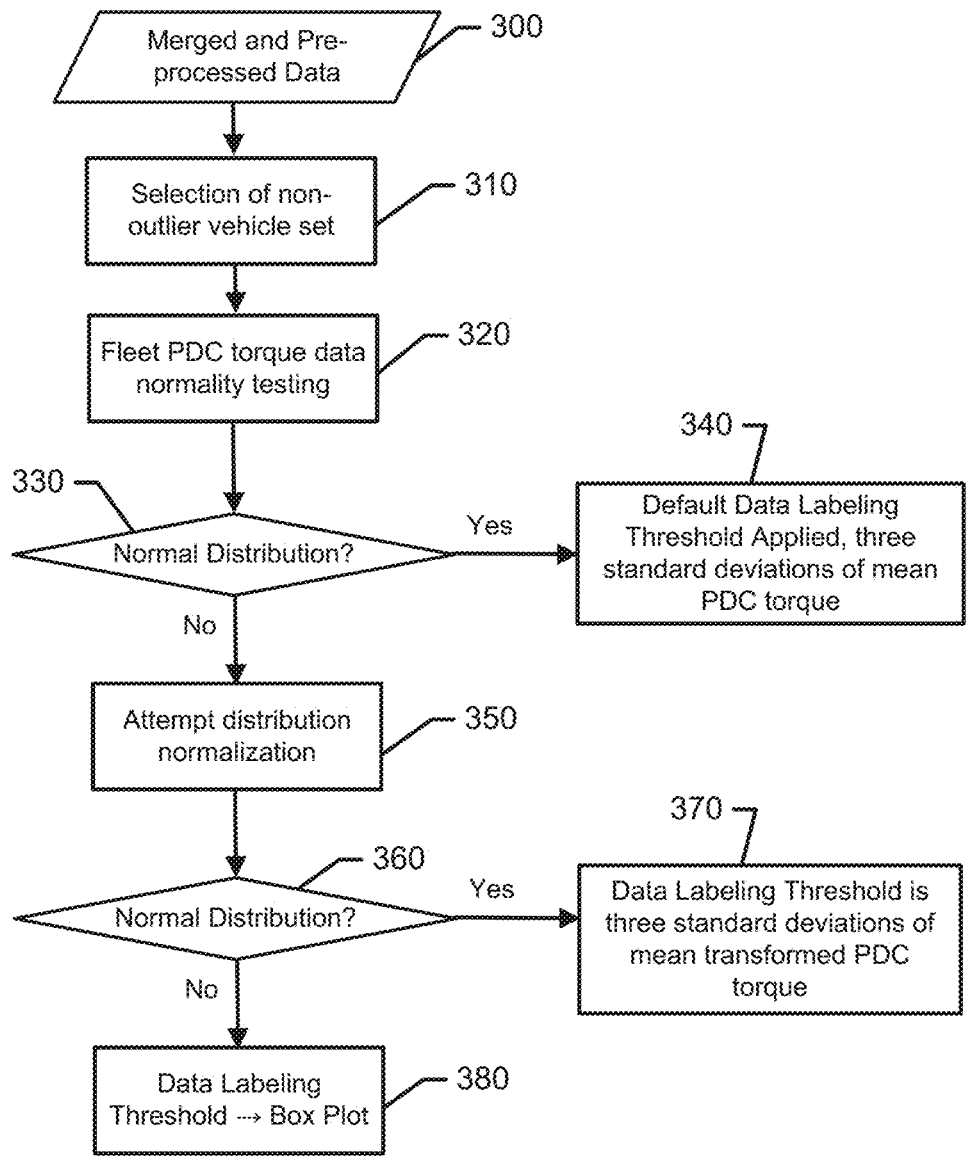
FIG. 3 illustrates a block diagram showing training of classifiers for identifying outlier thresholds in accordance with an example embodiment.

FIG. 3 illustrates a flowchart showing how the outlier threshold 250 may be calculated or otherwise determined in accordance with an example embodiment. In this regard, as shown in FIG. 3, merged and pre-processed data 300 may initially be received (e.g., as an output from operation 230 of FIG. 2. Thereafter, at operation 310, a first step in the calculation of the outlier threshold 250 may include the selection of a set of non-outlier vehicles, which may otherwise be referred to as healthy vehicles since, with respect to the parameter being studied at least, such vehicles are normal, or considered within the range of normal values for the parameter being studied (e.g., PDC torque data). Non-outlier (e.g., healthy) vehicles may again be identified by VIN or another unique identifier for each vehicle. In an example embodiment, a vehicle may be considered to be a non-outlier vehicle if the absolute value of its mean PDC torque is <M& p value>0.05 & 3σ<S & Tests count>N, where N, S and M are calibratable parameters and a is a standard deviation, and the p value may be specific to the normality test employed.

Thereafter, fleet PDC torque data normality testing may be accomplished at operation 320. In this operation, fleet datasets considered for detecting parametric outliers may be constructed using the non-outlier vehicles identified in operation 310. However, VIN data (with a normal distribution) may not always have a normal distribution (e.g., p value less than 0.05) when combined. This results from the combining of multimodal distributions, and a possible remedy may be to increase N.

At operation 330, a determination is made as to whether the data distribution is normal. Two different normality tests, a Shapiro-Wilk test (p value 4.5 e$^{-8}$) and an Anderson-Darling test (p value 4.1e$^{-8}$) may be used to quantitatively assess the normality of the data distribution. If the data distribution is normal, a default data label threshold may be applied at operation 340. The default formula for threshold calculation associated with operation 340 may be the mean of PDC torque +/−3σ, or three standard deviations in some example embodiments. If the data distribution is non-normal, an attempt to normalize the data may be made at operation 350.

The attempt to normalize that data may, in some examples, employ a Box-Cox transformation. The original form of the Box-Cox transform may take the form:

$$y(\lambda) = \begin{cases} \frac{y^\lambda - 1}{\lambda}, & \lambda \neq 0 \\ \log y, & \lambda = 0 \end{cases}$$

where y is the response variable and $\lambda$ is the transformation parameter to be optimized. If the transformation is successful, then Mean($\widetilde{PDC\,Torque}$)±3·C are used as the outlier thresholds. Note that $\widetilde{PDC\,Torque}$=(PDC Torque− α·min(PDC Torque))$^\lambda$, where $\widetilde{PDC\,Torque}$ is the transformed PDC torque. The term α·min(PDC Torque))$^\lambda$, where α is a calibration term, is added because the Box-Cox transform requires positive data (α=2 in this example). If the Box-Cox transform does not work in normalizing the data, the Box Plot method may be used to determine the outlier thresholds at operation 380. In some examples, other experience-based limits may be set including:

(Applied Data Threshold)$_{hi}$ = min((Calculated Threshold)$_{hi}$, +0.55)

(Applied Data Threshold)$_{lo}$ = max(−0.55, (Calculated Threshold)$_{lo}$).

The process shown in FIG. 3 may be repeated periodically or continuously to update the values determined for the outlier threshold 250 over time. This makes the determination of the outlier threshold 250 a dynamic threshold that may also change over time. The training of classifiers (e.g., of the testing module 164) of the machine learning module 160 may therefore be updated and remain sensitive to parametric outliers even as production changes occur with tighter tolerances or better accuracy. The testing module 164 may therefore continue to adapt to changing production trends for a given fleet or class of vehicles, and also rapidly develop accurate acceptable ranges of parametric values, and therefore also quickly identify parametric outliers, for entirely new fleets or classes of vehicles. As a result, parametric outliers (e.g., vehicles exhibiting excessive pull/drift behavior, may be identified to better understand customer usage and vehicle performance. Once identified, individually or as a set of vehicles with parametric outliers, analysis of the vehicles, corrective actions, and maintenance or repair may all be directed. However, as noted above, since trip summary data is also considered, false positives and situations where context dictates unreliability of the data may also be prevented.

Figure 4:
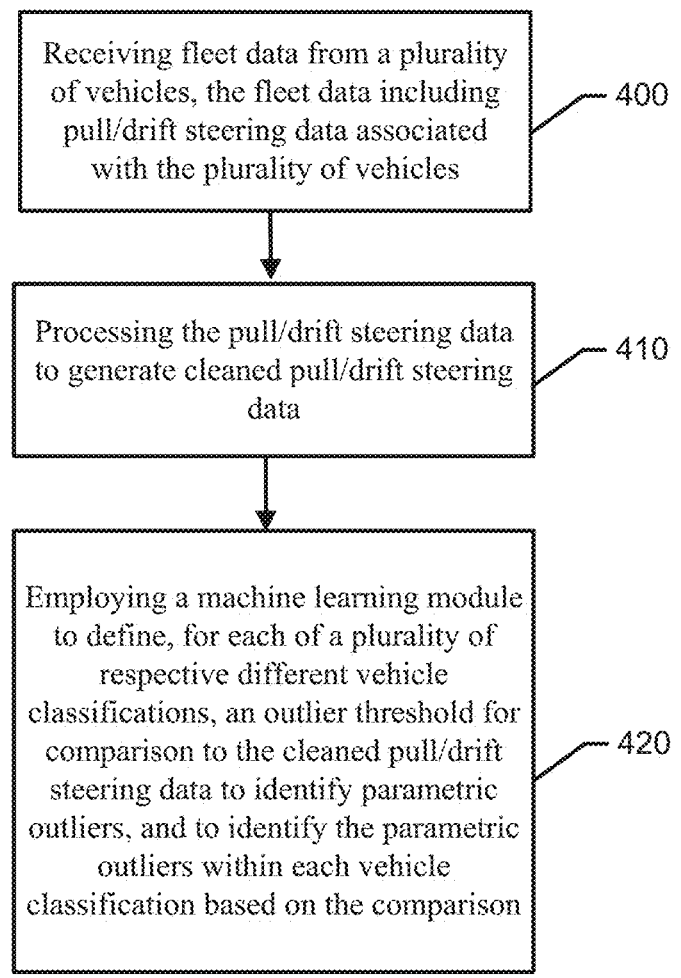
FIG. 4 illustrates a block diagram of a method of identifying parametric outliers associated with vehicle pull/drift compensation in accordance with an example embodiment.

From a technical perspective, the classification engine 130 described above may be used to support various operations associated with an application or method for determining parametric outliers associated with vehicle pull/drift compensation. As such, the platform described in FIG. 1 may be used to facilitate the implementation of several computer programs. As an example, FIG. 4 is an example of a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart of FIG. 4 support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. The method of FIG. 4, which may be a method of identifying parametric outliers associated with vehicle pull/drift compensation may include receiving fleet data from a plurality of vehicles where the fleet data includes pull/drift steering data associated with the plurality of vehicles at operation 400. The method may further include processing the pull/drift steering data to generate cleaned pull/drift steering data at operation 410. The method may also include employing a machine learning module to define, for each of a plurality of respective different vehicle classifications, an outlier threshold for comparison to the cleaned pull/drift steering data to identify parametric outliers, and to identify the parametric outliers within each vehicle classification based on the comparison at operation 420.

In an example embodiment, an apparatus (e.g., the classification engine 130) for performing the method of FIG. 4 above may comprise a processor (e.g., the processor 170) or processing circuitry configured to perform some or each of the operations (400-420) described above. The processor may, for example, be configured to perform the operations (400-420) by performing hardware implemented logical functions, executing stored instructions, or executing algorithms for performing each of the operations. In some embodiments, the processor or processing circuitry may be further configured for the additional operations or optional modifications to operations 400-420 that are discussed below.

The method (or apparatus configure to perform the method) of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the machine learning module may determine the outlier threshold dynamically over time as additional fleet data is received. In an example embodiment, the fleet data may further include trip summary data including corresponding information about a location or driving conditions encountered by each of the plurality of vehicles while the pull/drift steering data is obtained. In some cases, processing the pull/drift steering data may include determining pull/drift compensation applied during a trip based on the trip summary data. In an example embodiment, processing the pull/drift steering data may include employing collection delay limits calculated using trip start time and pull/drift compensation collection time. In some cases, receiving fleet data from the plurality of vehicles may include receiving pull/drift compensation data from connected vehicle data communicated to a central server. The pull/drift compensation data may be recorded at each respective one of the plurality of vehicles via a local pull/drift compensation module, and the pull/drift compensation data may correspond to compensation torque provided based on handwheel torque, handwheel angle and vehicle speed. In an example embodiment, the outlier threshold may be calculated using only data associated with vehicles identified to be a mean compensation torque within a predefined range of torque values. In some cases, the outlier threshold may be within three standard deviations of the mean compensation torque. In an example embodiment, the outlier threshold may be determined responsive to an initial determination regarding whether data used to calculate the outlier threshold defines a normal distribution and, if the data used to calculate the outlier threshold does not define the normal distribution, then an attempt to normalize the data is made prior to defining the outlier threshold. In some cases, the attempt to normalize the data may include applying a Box-Cox transformation to the data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of identifying parametric outliers associated with vehicle pull/drift compensation, the method comprising:
   receiving fleet data from a plurality of vehicles, the fleet data including pull/drift steering data associated with the plurality of vehicles;
   processing the pull/drift steering data to generate cleaned pull/drift steering data;
   employing a machine learning module to define, for each of a plurality of respective different vehicle classifications, an outlier threshold for comparison to the cleaned pull/drift steering data to identify parametric outliers, and to identify the parametric outliers within each vehicle classification based on the comparison; and
   directing a correction of vehicle alignment to the plurality of vehicles identified as the parametric outliers,
   wherein receiving fleet data from the plurality of vehicles comprises receiving pull/drift compensation data from connected vehicle data communicated to a central server and recorded at each respective one of the plurality of vehicles via a local pull/drift compensation module, and
   wherein the outlier threshold is calculated using only data associated with vehicles identified to have a mean compensation torque within a predefined range of torque values.

2. The method of claim 1, wherein the machine learning module determines the outlier threshold dynamically over time as additional fleet data is received.

3. The method of claim 1, wherein the fleet data further comprises trip summary data including corresponding information about a location or driving conditions encountered by each of the plurality of vehicles while the pull/drift steering data is obtained.

4. The method of claim 3, wherein processing the pull/drift steering data comprises determining pull/drift compensation applied during a trip based on the trip summary data.

5. The method of claim 1, wherein processing the pull/drift steering data comprises employing collection delay limits calculated using trip start time and pull/drift compensation collection time.

6. The method of claim 1,
   wherein the pull/drift compensation data corresponds to compensation torque provided based on handwheel torque, handwheel angle and vehicle speed.

7. The method of claim 1, wherein the outlier threshold is within three standard deviations of the mean compensation torque.

8. The method of claim 6, wherein the outlier threshold is determined responsive to an initial determination regarding whether data used to calculate the outlier threshold defines a normal distribution and, if the data used to calculate the outlier threshold does not define the normal distribution, then an attempt to normalize the data is made prior to defining the outlier threshold.

9. The method of claim 8, wherein the attempt to normalize the data comprises applying a Box-Cox transformation to the data.

10. A vehicle pull/drift data classification engine comprising:
    a data pre-processor to receive fleet data from a plurality of vehicles, the fleet data including pull/drift steering data associated with the plurality of vehicles, and to process the pull/drift steering data to generate cleaned pull/drift steering data; and
    a machine learning module employing machine learning to define, for each of a plurality of respective different vehicle classifications, an outlier threshold for comparison to the cleaned pull/drift steering data to identify parametric outliers, to identify the parametric outliers within each vehicle classification based on the comparison, and to direct a correction of vehicle alignment to the plurality of vehicles identified as the parametric outliers,
    wherein receiving fleet data from the plurality of vehicles comprises receiving pull/drift compensation data from connected vehicle data communicated to a central server and recorded at each respective one of the plurality of vehicles via a local pull/drift compensation module, and
    wherein the outlier threshold is calculated using only data associated with vehicles identified to have a mean compensation torque within a predefined range of torque values.

11. The classification engine of claim 10, wherein the machine learning module determines the outlier threshold dynamically over time as additional fleet data is received.

12. The classification engine of claim 10, wherein the fleet data further comprises trip summary data including corresponding information about a location or driving conditions encountered by each of the plurality of vehicles while the pull/drift steering data is obtained.

13. The classification engine of claim 12, wherein processing the pull/drift steering data comprises determining pull/drift compensation applied during a trip based on the trip summary data.

14. The classification engine of claim 10, wherein processing the pull/drift steering data comprises employing collection delay limits calculated using trip start time and pull/drift compensation collection time.

15. The classification engine of claim 10,
    wherein the pull/drift compensation data corresponds to compensation torque provided based on handwheel torque, handwheel angle and vehicle speed.

16. The classification engine of claim 10, wherein the outlier threshold is within three standard deviations of the mean compensation torque.

17. The classification engine of claim 15, wherein the outlier threshold is determined responsive to an initial determination regarding whether data used to calculate the outlier threshold defines a normal distribution and, if the data used to calculate the outlier threshold does not define the normal distribution, then an attempt to normalize the data is made prior to defining the outlier threshold.

18. The classification engine of claim 17, wherein the attempt to normalize the data comprises applying a Box-Cox transformation to the data.

* * * * *